Nov. 11, 1947. H. SCHULZ 2,430,649
TRIPOD
Filed Aug. 24, 1945
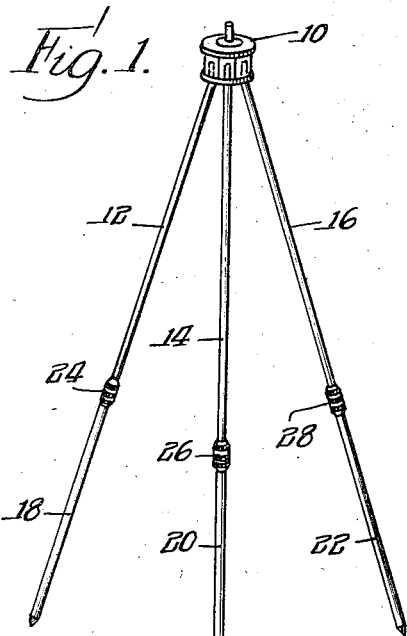
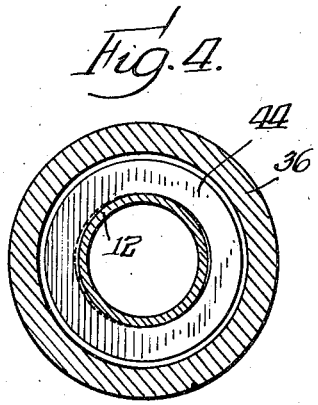
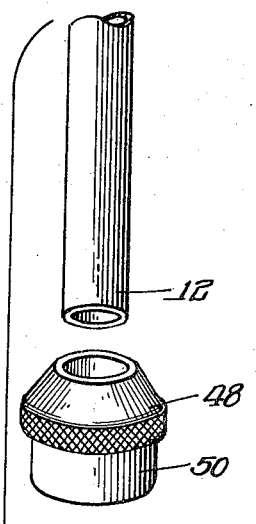
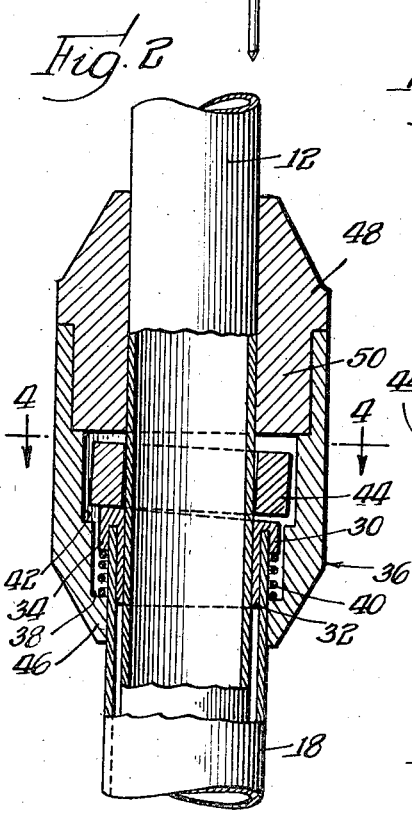
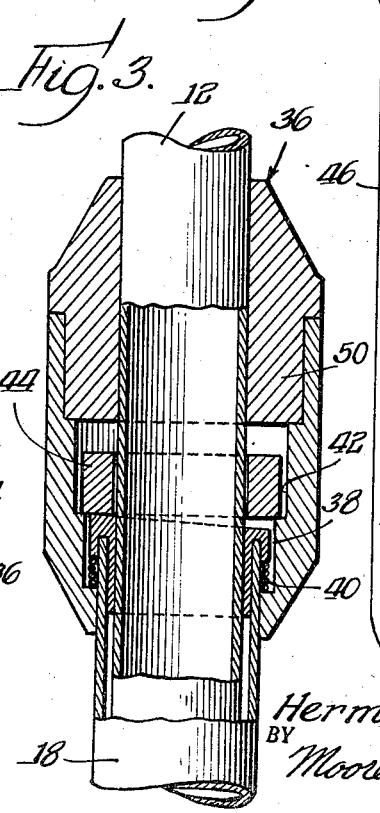
INVENTOR.
Herman Schulz
BY Moore, Olson & Trexler
attys.

Patented Nov. 11, 1947

2,430,649

UNITED STATES PATENT OFFICE 2,430,649

TRIPOD

Herman Schulz, Chicago, Ill.

Application August 24, 1945, Serial No. 612,404

7 Claims. (Cl. 248—191)

The present invention relates to a connection for coaxial members which may be extended and telescoped, and more particularly to such connections used with a tripod.

In the construction of tripods, particularly tripods for photographic use, it has long been desired to provide a relatively rigid yet light-weight tripod. In order to achieve light weight, tripods heretofore have had legs formed of light alloy or light metal tubes arranged so that they might be telescoped. In such structures, however, it has not been convenient to provide an arrangement whereby the legs might be adjusted so as to have different lengths to accommodate the tripod to uneven terrain. To correct for the non-horizontal position of the head of the tripod, it has been necessary to employ some adjustable device. Such adjustable device, however, again increased the carrying weight of the tripod, and hence constituted a disadvantage. It, therefore, would be desirable to provide an improved tripod with extensible legs which might be extended readily different amounts so that the tripod head might be held horizontal in spite of uneven ground surface or terrain, or the tripod head might be tilted to any desired angle by adjustment of the length of the legs of the tripod.

It, therefore, is an object of the present invention to provide an improved tripod having legs which can readily be adjusted to different lengths.

It is a further object of the present invention to provide an improved connection for coaxial members so as to readily permit the extension and collapse of such members.

It is a still further object of the present invention to provide an improved connection between coaxial members, such as the legs of a tripod, which may be extended to any desired position and which will automatically lock in such position.

A still further object of the present invention is to provide an improved connection between sections of coaxial members whereby a manual manipulation, without screw members, will permit the extended members to be contracted.

In accordance with the present invention, the improved form of tripod leg is obtained by providing a connection which automatically permits extension of the leg any desired amount and locks the extended leg in such position. A housing or sleeve containing such parts may be actuated axially to permit collapse of the leg for carrying a tripod.

Other and further objects of the present invention subsequently will become apparent by reference to the following description when taken in connection with the accompanying drawing wherein—

Figure 1 is a perspective view of a tripod constructed in accordance with the present invention;

Figure 2 is a cross-sectional view of the tripod leg connected in its normal operating position where the device automatically operates to lock in position the extended leg portions of the tripod;

Figure 3 illustrates the position of the parts shown in Figure 2 when manipulated manually for unlocking action;

Figure 4 is a transverse view as seen in the direction of the arrows along the line 4—4 of Figure 2;

Figure 5 is an exploded view of the parts comprising the connection between the inner and outer leg portions of the tripod.

In Figure 1 there is shown a tripod having a head 10 to which are hingedly secured the upper leg portions 12, 14 and 16 of the tripod. Lower leg portions 18, 20 and 22 are connected to the upper leg portions 12, 14 and 16 respectively by connectors 24, 26 and 28. The connections or connectors 24, 26 and 28 permit the lower leg portions 18, 20 and 22 to be moved outwardly any desired amount so as to permit positioning the head 10 of the tripod as desired. For maximum rigidity of the tripod, the legs 12, 14 and 16 are generally hinged and arranged so that the outward movement of the legs is limited by a suitable stop construction, as is commonly employed in many tripods at present. With such construction, the lower extremities of the legs may be adjusted so as to position the head 10 in a horizontal plane, even though the ground or terrain is uneven. Furthermore, where it is desired to tilt the head 10, one of the legs may be extended a greater amount.

The construction of each of the connections 24, 26 and 28 will be appreciated by reference to the remaining figures. In Figure 2 there is shown the upper rod 12, which may comprise a tube of suitable light metal where it is particularly desired to decrease the weight of the tripod. The outer tube 18, as is customary, may have an inner diameter somewhat in excess of the outer diameter of the upper tube or rod 12. A suitable bearing member 30 may be positioned about the upper extremity of the lower rod 18. This bearing member 30 has an upper surface which is at a slight angle to a normal transverse plane with respect to the axes of the tubes 12 and 18. The bearing member 30 has a reentrant portion 32 which serves as a sleeve bearing for engaging the outer diameter of the upper rod or tube 12. A dependent portion 34 surrounds the outer diameter of the upper end of the outer rod 18. A casing or housing 36 has an annular recess 38 slightly larger than the outside diameter of the bearing member 30. A spring 40 is positioned between the bottom of the recess 36 and the under side of the overhanging lip portion 34 so as normally to position the housing 36 downwardly for purposes which subsequently will become apparent. Immediately above the annular recess 36 there is a larger diameter recess 42 so that at the junction of these two there is formed a shoulder or stop. An annular member 44, having an inner diameter so as to provide a free sliding fit about the upper rod or tube 12, is positioned within the annular recess 42 so as normally to engage the upper surface of the bearing member 30. The annular member 44 tends to tilt due to the inclined top surface of the member 30, thus producing a binding action preventing a telescoping movement of the members 12 and 18. The member 44, however, does not retard an extensible motion of the two members. The housing 36 is conveniently formed in two portions 46 and 48, as is seen in Figure 5. The upper portion 48 has a reentrant portion 50 positioned a short distance above the top of the annular member 44.

In the event that the annular member 44 has become wedged on the upper rod or tube 12 when it is desired to extend the tripod leg, a downward motion of the outer tube 18 or an upward pull on the tube 12, either of which results in a force tending to separate the tubes and this force will bring the annular member 44 against the bottom surface of the reentrant portion 50 of the upper half of the housing, thus straightening the position of the annular member 44 so that it is in a plane normal to the axis of the rod 12. In such position the annular member 44 has a freely sliding fit connection with the rod 12. Thus the rod 12 may be withdrawn from the lower tube 18 to extend or increase the length of the tripod leg.

When it is desired to telescope the legs or shorten the legs, the operator grasps the exterior of the housing 36 and moves it upwardly so that the shoulder formed by the juncture of the recesses 38 and 42 engages the under side of the annular member or washer 44. The shoulder at least initially engages the annular member or washer 42 at a point substantially diametrically opposed to, or otherwise sufficiently remote from the limited portion of engagement between the high portion of the inclined end of member 18 and the washer to shift the washer 44 from an inclined position to a position which is normal to the axis of the upper tube or rod 12, thus permitting the tube 12 to move through the washer 44. This movement may continue as much as desired. Upon release of the outer member 36, the spring 40 will again move the housing downwardly a certain amount so that the annular member 44 will tend to assume the position shown in Figure 2, in which position the member is in readiness to automatically lock the inner and outer leg members in any desired position.

The outer housing 36, as is apparent from Figure 5, is formed of two portions 46 and 48. The reentrant portion 50 of the upper portion 48 may, if desired, be formed with threads for engagement with the lower portion 46. On the other hand, the reentrant member 50 may be formed so as to be retained in position frictionally or secured by other suitable methods, such as slightly rolling the outer periphery of the upper portion of the lower housing member 46.

While the bearing member 30 may conveniently comprise an individual element, it, of course, will be appreciated that the upper end of the lower tube 18 may be formed in such manner as to combine integrally the functions of the member 30. While in many instances the upper leg portion 12 has been shown to be a tube, it, of course, will be appreciated that a solid rod may be utilized. If it is further desired to telescope the tripod legs into a much shorter length than is possible by the use of a single connector in each leg, a plurality of connectors may be employed by adding another concentric tube. The term "cylindrical member" is intended to cover both solid and hollow cylindrical members such as the rod and tube referred to.

While for the purpose of illustrating and describing the present invention a preferred embodiment has been shown in the drawing, it is to be understood that the disclosure is not deemed to be a limitation since such variations in the structure and in the arrangement of the component members is contemplated as may be commensurate with the spirit and scope of the invention set forth in the following claims.

This invention is hereby claimed as follows:

1. The combination comprising two concentrically arranged elongated cylinders and a connection therebetween normally permitting movement between the cylinders in only one direction, an annular member relatively loosely mounted on the inner cylinder, a sleeve axially slidable on and surrounding the outer cylinder and having a portion thereof extending around the inner cylinder to enclose said annular member and having means thereon to maintain said annular member normal to the axes of said cylinders to provide for free telescoping movement of the cylinders, and said outer cylinder terminating in a surface at a slight angle to a normal transverse plane to engage said annular member and shift the same to canted binding engagement with the inner cylinder whereby to prevent movement of the cylinders in the opposite direction.

2. The combination comprising two concentrically arranged elongated cylinders and a connection therebetween normally permitting movement between the cylinders in only one direction comprising a sleeve axially slidable on and surrounding the outer cylinder and having a portion thereof extending around the inner cylinder, an annular member relatively loosely mounted on the inner cylinder and disposed within said sleeve, and said outer cylinder terminating in a surface at a slight angle to a normal transverse plane to engage said annular member and shift the same to canted binding engagement with the inner cylinder whereby to prevent movement of the cylinders in the opposite direction, and means providing an inwardly extending shoulder on said sleeve and adapted for selective engagement with said annular member for positively shifting the same to a position substantially normal to the axes of said cylinders whereby to effect relative unlatching between said cylinders.

3. In combination with two concentrically arranged inner and outer elongated cylinders, an annular member freely mounted on the inner cylinder and adapted to be shifted upon engagement with the adjacent end of the outer cylinder to an inclined position binding on the inner cylinder to prevent telescoping movement of said cylinders toward collapsed position but permitting extensible telescoping movement therebetween, and a sleeve disposed around the end of the outer cylinder and also around the adjacent portion of the inner cylinder to enclose said annular member and adapted upon relative longitudinal movement with respect to said outer cylinder and into engagement with said annular member to shift the said annular member to a position substantially normal to the longitudinal axes of said cylinders whereby to permit telescoping movement of the said cylinders toward collapsed position.

4. In a tripod having a head and a plurality of adjustable legs each including inner and outer coaxial tubes, the provision of a housing surrounding said tubes at the end of the outer tube and adapted to slide longitudinally with respect thereto, an annular member freely mounted on the inner tube and disposed within said housing, means carried by the adjacent end of the outer tube and engageable with a limited portion of said annular member for shifting the same to an inclined position binding on said inner tube whereby to prevent telescoping movement of said tubes toward collapsed position but providing for extensible telescoping movement therebetween, and means providing an internal shoulder on said housing adapted for engagement with said annular member upon longitudinal shifting thereof for positioning said annular member in a plane substantially normal to the plane of said tubes whereby to permit telescoping movement between said tubes toward collapsed position.

5. A tripod having a head connected to a plurality of legs formed of coaxially arranged tubes, a connection between adjacent tubes comprising a housing having sliding fit openings therein for adjacent tubes, means mounted adjacent the end of the larger tube to provide a bearing surface for the smaller tube and to provide an end surface inclined to a plane normal to the axes of the tubes, an annular member freely mounted on the smaller tube within said housing in sliding fit relation, said annular member normally engaging the inclined surface of said bearing member at the end of the larger tube to resist telescoping or collapsing movement of said tubes, said housing having an internal shoulder normally out of engagement with said annular member but arranged for manual movement into engagement therewith for positioning said annular member in a normal transverse plane to permit said tubes to be moved to collapsed position.

6. In combination with inner and outer elongated telescoping members, an annular member disposed relatively loosely around an inner telescoping member and the immediately adjacent outer telescoping member having canting means engageable with a limited portion of said annular member for canting the same into locking engagement with the adjacent inner telescoping member whereby to prevent telescoping movement of said members toward collapsed position but providing for extensible telescoping movement therebetween, and means carried by the said adjacent outer telescoping member and slidable axially thereof into contact with said annular member sufficiently remote from the limited portion thereof which is in engagement with said canting means to effect shifting of the annular member to a position substantially normal to the axes of said telescoping members whereby to permit telescoping movement of said members toward collapsed position.

7. In combination with inner and outer elongated telescoping members, an annular member disposed relatively loosely around an inner telescoping member and the immediately adjacent outer telescoping member having means engageable with a limited portion of said annular member for canting the same into locking engagement with the adjacent inner telescoping member whereby to prevent telescoping movement of said members toward collapsed position but providing for extensible telescoping movement therebetween, and means including a housing enclosing said annular member and carried by the said adjacent outer telescoping member for axial sliding movement relative thereto into substantial surface contact with said annular member for shifting and maintaining the same in a position substantially normal to the axes of said telescoping members whereby to permit telescoping movement of said members toward collapsed position.

HERMAN SCHULZ.

REFERENCES CITED

The following references are of record in the file of this patent:

UNITED STATES PATENTS

| Number | Name | Date |
| --- | --- | --- |
| 260,068 | Van Kirk | June 27, 1882 |
| 388,195 | Hammond et al. | Aug. 21, 1888 |
| 414,903 | Godillot | Nov. 12, 1889 |
| 836,303 | Christensen | Nov. 20, 1906 |
| 1,235,613 | Vandergrift | Aug. 7, 1917 |
| 2,333,501 | Whitman | Nov. 2, 1943 |